US012618205B2

(12) United States Patent
Schroeder et al.

(10) Patent No.: US 12,618,205 B2
(45) Date of Patent: May 5, 2026

(54) PAVEMENT GRINDING DRUM HAVING MODULAR BIT MOUNTINGS

(71) Applicant: Graco Minnesota Inc., Minneapolis, MN (US)

(72) Inventors: James C. Schroeder, Ramsey, MN (US); Daniel D. Rohling, Corcoran, MN (US); Roland M. Bedard, Lindstrom, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 78 days.

(21) Appl. No.: 18/609,728

(22) Filed: Mar. 19, 2024

(65) Prior Publication Data

US 2024/0328097 A1 Oct. 3, 2024

Related U.S. Application Data

(60) Provisional application No. 63/456,578, filed on Apr. 3, 2023.

(51) Int. Cl.

*E01C 23/088* (2006.01)
*B28D 1/18* (2006.01)
*E21C 35/19* (2006.01)

(52) U.S. Cl.

CPC ............ *E01C 23/088* (2013.01); *B28D 1/188* (2013.01); *E21C 35/19* (2013.01)

(58) Field of Classification Search

CPC ..... E21C 35/19–1936; B28D 1/18–188; E01C 23/088

See application file for complete search history.

(56) References Cited

U.S. PATENT DOCUMENTS

| | | | | | |
|---|---|---|---|---|---|
| 5,322,351 | A * | 6/1994 | Lent | E21C 35/193 | 299/102 |
| 5,529,249 | A * | 6/1996 | Braun | B02C 13/2804 | 241/300 |
| 5,775,781 | A | 7/1998 | Sawtelle et al. | | |
| 5,842,747 | A * | 12/1998 | Winchester | E01C 23/088 | 299/87.1 |
| 5,884,979 | A * | 3/1999 | Latham | E21C 35/18 | 299/87.1 |
| 5,904,408 | A * | 5/1999 | Olson | E21C 35/193 | 299/87.1 |

(Continued)

FOREIGN PATENT DOCUMENTS

| | | | |
|---|---|---|---|
| DE | 202009004190 | U1 | 8/2010 |
| GB | 2394245 | A | 4/2004 |
| WO | 2019007885 | A1 | 1/2019 |

OTHER PUBLICATIONS

Extended European Search Report for EP Application No. 24168012.3, Dated Sep. 3, 2024, pp. 8.

(Continued)

*Primary Examiner* — Janine M Kreck
(74) *Attorney, Agent, or Firm* — Kinney & Lange, P.A.

(57) ABSTRACT

A pavement grinder is configured to rotate to remove pavement. The pavement grinder includes a pavement grinding drum with bit mountings mounted to the pavement grinding drum. The bit mountings are individually removable from and replaceable on the drum. The bit mountings each include a bit that is configured to engage with the pavement to remove pavement.

17 Claims, 12 Drawing Sheets

(56) References Cited

U.S. PATENT DOCUMENTS

| | | | | |
|---|---|---|---|---|
| 6,422,495 | B1 * | 7/2002 | De Boef | B02C 18/067 241/294 |
| 6,948,779 | B2 | 9/2005 | Ehler et al. | |
| 7,494,080 | B2 | 2/2009 | Knotts | |
| 7,959,099 | B1 | 6/2011 | Cox et al. | |
| 8,672,416 | B2 | 3/2014 | Wachsmann | |
| 8,740,121 | B1 * | 6/2014 | Cox | B02C 18/18 241/242 |
| 8,740,313 | B2 | 6/2014 | Chiang | |
| 8,820,848 | B2 | 9/2014 | Rotsch et al. | |
| 9,238,893 | B2 * | 1/2016 | Latham | E01C 23/088 |
| 9,631,490 | B2 | 4/2017 | Latham | |
| 10,329,909 | B2 | 6/2019 | Seibert et al. | |
| 10,724,369 | B2 | 7/2020 | Torres Delgado et al. | |
| 2005/0098015 | A1 * | 5/2005 | Latham | E21C 35/1936 83/698.41 |
| 2015/0054332 | A1 * | 2/2015 | Latham | E01C 23/088 29/426.5 |
| 2020/0340192 | A1 * | 10/2020 | Dickson | B02C 21/02 |

OTHER PUBLICATIONS

Keystone Engineering, Pavement Marking Removal, RS Quick Change System, Retrieved Mar. 19, 2024 from https://www.keystonecutter.com/product-cards/MARKING-REMOVAL-RS-QUICK-CHANGE-SYSTEM.pdf, pp. 1.

Keystone Engineering, Pavement Marking Removal, Quick-Change Blade System, Retrieved Mar. 19, 2024 from https://www.keystonecutter.com/Product-Cards/MARKING-REMOVAL-BL-SYSTEM.pdf, pp. 1.

Keystone Engineering, Marking Removal, Replacement Drums for all Grinding Machines, Retrieved Mar. 19, 2024 from https://www.keystonecutter.com/Product-Cards/MARKING-REMOVAL-EZ-SCREW-DRUM-SYSTEM.pdf, pp. 1.

Keystone Engineering, Horizontal Floor Grinding, Replacement Systems for all Grinding Machines, Retrieved Mar. 19, 2024 from https://www.keystonecutter.com/Product-Cards/HORIZONTAL-FLOOR-GRINDING-RS-QUICK-CHANGE-SYSTEM.pdf, pp. 1.

* cited by examiner

PAVEMENT GRINDING DRUM HAVING MODULAR BIT MOUNTINGS

CROSS-REFERENCE TO RELATED APPLICATION(S)

This application claims priority to U.S. Provisional Application No. 63/456,578 filed Apr. 3, 2023 and entitled "PAVEMENT GRINDING DRUM HAVING MODULAR BIT MOUNTINGS," the disclosure of which is hereby incorporated by reference in its entirety.

BACKGROUND

The present disclosure concerns removal of hardened material from ground surfaces. More particularly, the present disclosure concerns grinders for grinding removal of the hardened material.

Hardened material, such as pavement, can be removed from a ground surface by grinding. A grinding machine includes grinding bits that are rotated to come into contact with and grind the pavement. When grinding the hardened material, the grinding bits and driving structure can become worn and/or damaged. Regular maintenance and replacement of parts can be required. Such maintenance and replacement can be laborious and time consuming. For example, the grinder can include plates that support the grinding bits. The plates can be stacked on a shaft to assemble the grinder. Multiple plates may need to be removed to access and replace a worn grinding bit.

SUMMARY

According to an aspect of the disclosure, a grinding drum for grinding hardened material includes a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits. The plurality of bit mounting receivers are disposed in at least one mounting array and wherein the at least one mounting array is disposed helically about the mounting tube.

According to an additional or alternative aspects of the disclosure, a grinding drum for grinding hardened material includes a mounting tube, the mounting tube elongate along a tube axis, the mounting tube have a plurality of bit mounting receivers arrayed circumferentially around and longitudinally along the mounting tube; a first end hub mounted to a first end of the mounting tube, the first end hub including a first shaft bore extending therethrough on the tube axis; a second end hub mounted to a second end of the mounting tube, the second end hub including a second shaft bore extending therethrough on the tube axis, the second shaft bore axially aligned with the first shaft bore such that a drive shaft can extend through the first shaft bore, the mounting tube, and the second shaft bore; and a plurality of bit mountings respectively received in the plurality of bit mounting receivers, the plurality of bit mountings comprising a plurality of bits. Each bit mounting of the plurality of bit mountings are individually mounted to the mounting tube and are removably mounted to the mounting tube.

According to another additional or alternative aspects of the disclosure, a grinding drum for grinding hardened material includes a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits. Each bit mounting of the plurality of bit mountings is removably mounted to the mounting tube. Each bit mounting of the plurality of bit mountings is angled offset from the tube axis.

According to yet another additional or alternative aspects of the disclosure, a grinding drum for grinding hardened material includes a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits. A first bit mounting of the plurality of bit mountings is at least partially disposed in a first bit mounting receiver of the plurality of bit mounting receivers. The first bit mounting receiver extends along a mount axis angled relative to the tube axis such that the mount axis does not intersect the tube axis.

According to yet another additional or alternative aspects of the disclosure, a grinding drum for grinding hardened material includes a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits. A first bit mounting of the plurality of bit mountings includes a first head supporting a first bit of the plurality of bits; and a first stem extending from the first head. A first bit mounting receiver of the plurality of bit mounting receivers comprises a first outer recess. The first stem is at least partially disposed in the first outer recess such that a first leading inner notch of the first outer recess receives a first leading corner of the first stem and such that the first leading corner is radially overlapped by material defining the first outer recess both radially inward towards the tube axis and radially outward away from the tube axis.

According to yet another additional or alternative aspects of the disclosure, a grinding drum for grinding hardened material includes a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits. A first subset of the plurality of bit mountings is disposed in a first bit mounting array that extends axially and circumferentially about the mounting tube.

According to yet another additional or alternative aspects of the disclosure, a grinding drum for grinding hardened material includes a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits. A first subset of the plurality of bit mountings is disposed in a first bit mounting row that extends axially and circumferentially about the mounting tube.

According to yet another additional or alternative aspects of the disclosure, a grinding drum for grinding hardened material includes a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits. The plurality of bit mountings are disposed in a plurality of bit mounting arrays and a plurality of bit mounting rows. Laterally adjacent bit mountings within a bit mounting array of the plurality of bit mounting arrays circumferentially overlap. Longitudinally adjacent bit mountings within a bit mounting row of the plurality of bit mounting rows axially overlap.

According to yet another additional or alternative aspects of the disclosure, a grinding drum for grinding hardened material includes a mounting tube elongate along a tube axis, the mounting tube configured to support a plurality of bits; a first end hub mounted to a first end of the mounting tube, the first end hub including a first shaft bore extending therethrough on the tube axis; and a second end hub mounted to a second end of the mounting tube, the second end hub including a second shaft bore extending therethrough on the tube axis, the second shaft bore axially aligned with the first shaft bore such that a drive shaft can extend through the first shaft bore, the mounting tube, and the second shaft bore.

DETAILED DESCRIPTION

The present disclosure relates generally to removal of hardened surfaces, such as pavement, from a ground surface. Pavement is used herein as an example of a hardened material, though it is understood that aspects of the disclosure can be applied to removal of hardened materials other than pavement. Grinding drums according to the present disclosure include a drum that is configured to rotate on an axis. Bit mountings are mounted to the drum and each bit mounting includes a bit configured to contact the hardened surface to grind the hardened surface. The bit mountings are individually mountable and replaceable. Such a configuration allows for quick and easy removal and replacement of a single bit of the grinder.

Grinding drums according to aspects of the present disclosure include bits that are disposed in arrays on a mounting tube. The bits can be disposed in discrete arrays. The arrangement of the bits provides balanced grinding, resulting in less vibration and a smoother ground surface. The arrays can be disposed helically around the mounting tube.

Grinding drums according to aspects of the present disclosure can include end caps that are disposed on the ends of the mounting tube. The end caps are configured to mount to a drive shaft to receive driving force from the drive shaft. A body of the grinding drum can be formed by the mounting tube and the two end caps, providing reduced part count and simple assembly and operation. In some examples, the end caps are configured with a common configuration such that each end cap can mount on either end of the grinder drum.

Components can be considered to radially overlap when those components are disposed at common axial locations along an axis. A radial line extending from the axis will extend through each of the radially overlapping components. Components can be considered to axially overlap when those components are disposed at common radial and circumferential locations relative to an axis such that an axial line parallel to the axis extends through the axially overlapping components. Components can be considered to circumferentially overlap when aligned about the axis, such that a circle centered on the axis passes through the circumferentially overlapping components.

Figure 1A:
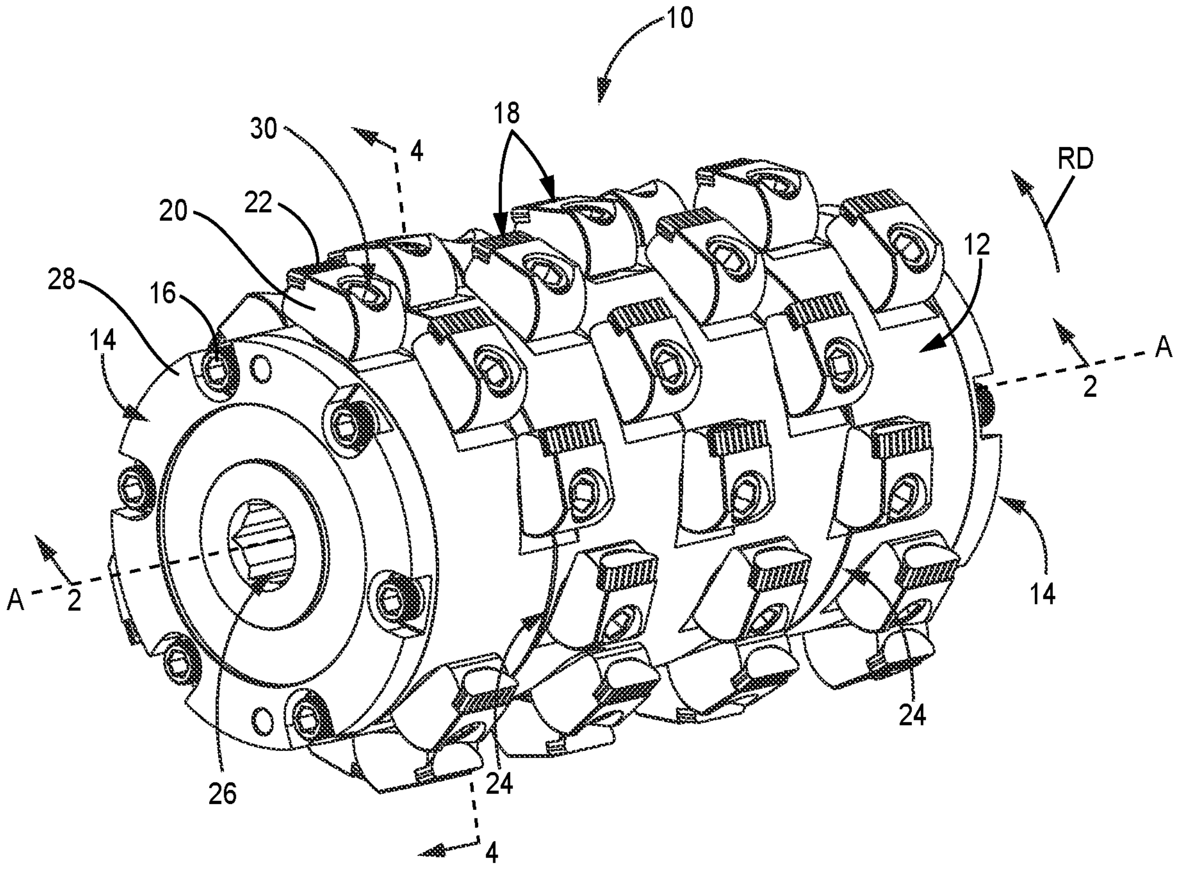
FIG. 1A is an isometric view of a grinding drum.
Figure 1B:
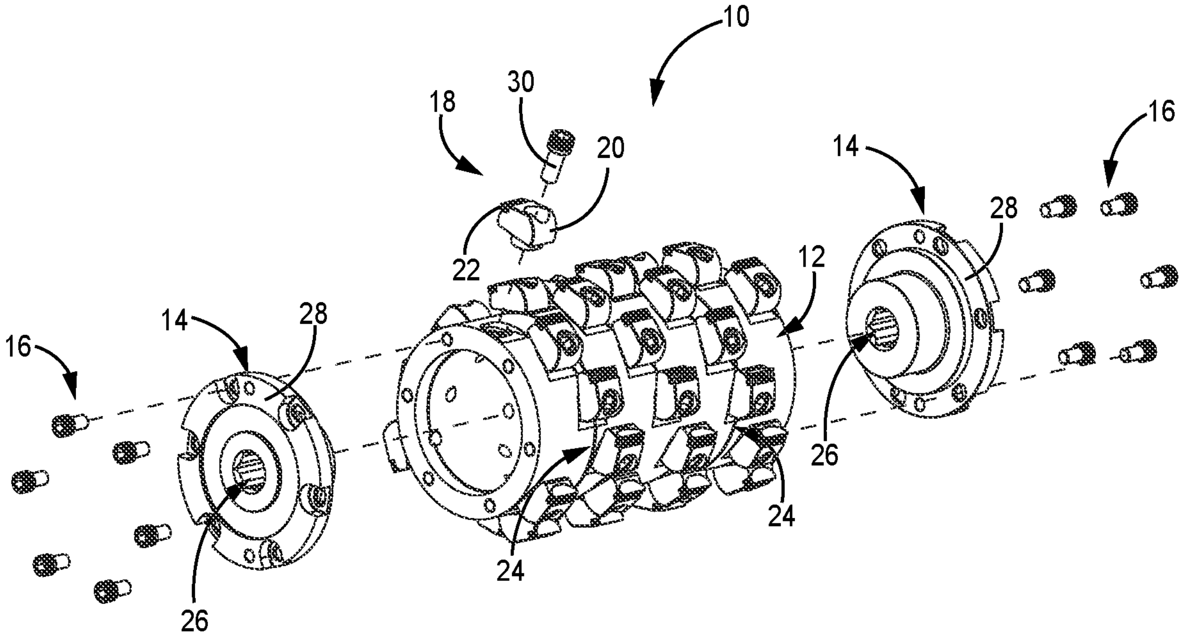
FIG. 1B is a partially exploded isometric view of the grinding drum.

FIG. 1A is an isometric view of grinding drum 10. FIG. 1B is a partially exploded view of grinding drum 10. FIGS. 1A and 1B are discussed together. Grinding drum 10 includes mounting tube 12, end hubs 14, hub fasteners 16, and bit mountings 18. Bit mountings 18 include bit holder 20 and bit 22.

Grinding drum 10 is configured to rotate on axis A-A to grind hardened material, such as pavement. Grinding drum 10 is configured to mount to a grinding machine to be rotated by the grinding machine. For example, grinding drum 10 can be mounted to a drive shaft of the grinding machine to receive a rotational output from the drive shaft. Grinding drum 10 can be mounted on a pavement grinding machine, which provides mechanical rotational motion to rotate the grinding drum 10 while pressing the grinding drum 10 into the hardened surface, typically by the weight of the machine resting partially or fully on the grinding drum 10, to grind the hardened surface. Such a pavement grinding machine can be a GrindLazer manufactured by Graco Inc. of Minnesota USA, or any other pavement grinding machine.

Mounting tube 12 is configured to support bit mountings 18. Mounting tube 12 can be a cylindrical piece that is elongate along the axis A-A. The axis A-A can also be referred to as a tube axis. The cylindrical profile of the mounting tube 12 is coaxial with the axis A-A. The mounting tube 12 can be formed from metal, such as steel or aluminum. In the example shown, the mounting tube 12 is formed from a single contiguous piece of metal. In various other examples, the mounting tube 12 can be formed from multiple parts, such as plates stacked together to form a mounting tube 12 which is not formed from a contiguous piece of metal. However, there can be advantages to having the mounting tube 12 formed from one contiguous piece of metal. For example, when assembling plates, tolerances between plates, and the risk of particle contamination being trapped between plates, can unintentionally change positioning and orientation of the bits relative to each other once assembled.

Indicator 24 is formed on the exterior of mounting tube 12. Indicator 24 provides a visual indication to the user of the grind width of the grinding drum 10. In the example shown, the indicators 24 are formed as annular grooves about the mounting tube 12. For example, some users may want to utilize a full axial width of the grinding drum 10 along the axis A-A for some grinding operations but may want to utilize less than a full width of the grinding drum 10 for other grinding operations. For example, a full width of the grinding drum 10 along axis A-A may be about 12 inches (in.) (about 30.43 centimeters (cm)) and a user may want to grind a 5 in. (about 12.70 cm) width. Indicator 24 is positioned to provide visual indication to the user regarding the width of the bit mountings 18 within the region defined by the indicator 24. In the example shown, the region between the pair of indicators 24 is a smaller grinding width than the full width of the grinding drum 10. A user can leave the bit mountings 18 between the indicators 24 mounted on the mounting tube 12 and remove bit mountings 18 outside of the region defined by the indicators 24 to grind the smaller width. It is understood that some examples can include multiple sets of indicators to facilitate grinding of more than two widths of may include only a single indicator 24. The indicators 24 allow the user to easily and quickly change the grind width of grinding drum 10.

Mounted on the ends of the mounting tube 12 are end hubs 14. In the example shown, grinding drum 10 includes a pair of end hubs 14 with one end hub 14 mounted to a first axial end of the mounting tube 12 and a second end hub 14 mounted to a second axial end of the mounting tube 12. Each end hub 14 includes a shaft bore 26 and hub flange 28. The shaft bore 26 is configured to receive the drive shaft from the grinding machine. The end hubs 14 can mount on the drive shaft of the grinding machine to support the grinding drum 10. The shaft bores 26 are also configured to receive the rotational output from the drive shaft and transmit the rotational output to mounting tube 12 to rotate bit mountings 18 on axis A-A. In the example shown, the shaft bore 26 is contoured such that the shaft bore 26 is non-circular. Such a configuration facilitates torque transfer from the drive shaft to the end hub 14 and thus to the mounting tube 12. In the example shown, the shaft bore 26 is hexed, though it is understood that other configurations are possible. The drive shaft can be rotated coaxial with the axis A-A through the shaft bores 26 of the end hubs 14 to rotate the grinding drum 10 coaxial with the axis A-A.

Hub fasteners 16 attach the end hubs 14 to the axial ends of the mounting tube 12. The hub fasteners 16 can be bolts to pass through the hub flange 28 of the end hub 14 to be received within threaded end apertures on the mounting tube 12, among other options.

Mounted circumferentially around the mounting tube 12, and axially along the axis A-A, are a plurality of bit mountings 18. An example of a bit mounting 18 is shown exploded away from the mounting tube 12 in FIG. 1B. The bit mounting 18 includes a bit holder 20. The bit holder 20 can be formed from metal, such as steel or aluminum. The bit mounting 18 includes a bit 22 supported by the bit holder 20. The bits 22 of the bit mountings 18 forms the sole cutting elements of the grinding drum 10, such that all other parts of the grinding drum 10 do not contact pavement, particularly pavement being ground. Each bit 22 of the plurality of bits 22 can have a common cutting shape with respect to the other bits 22. The bit mounting 18 further includes a mount fastener 30 for attaching the bit holder 20 to the mounting tube 12.

In the example shown, grinding drum 10 is configured to rotate in circumferential direction RD during grinding operations. The bits 22 are on a leading end of the bit mountings 18 to cause the bits 22 to impact the hardened surface during rotation of the grinding drum 10. In the example shown, mount fasteners 30 are disposed on a trailing side from the bit 22 such that the mount fastener 30 follows the bit 22 that the mount fastener 30 secures to the mounting tube 12 rather than leading that bit 22 during rotation.

Figure 2:
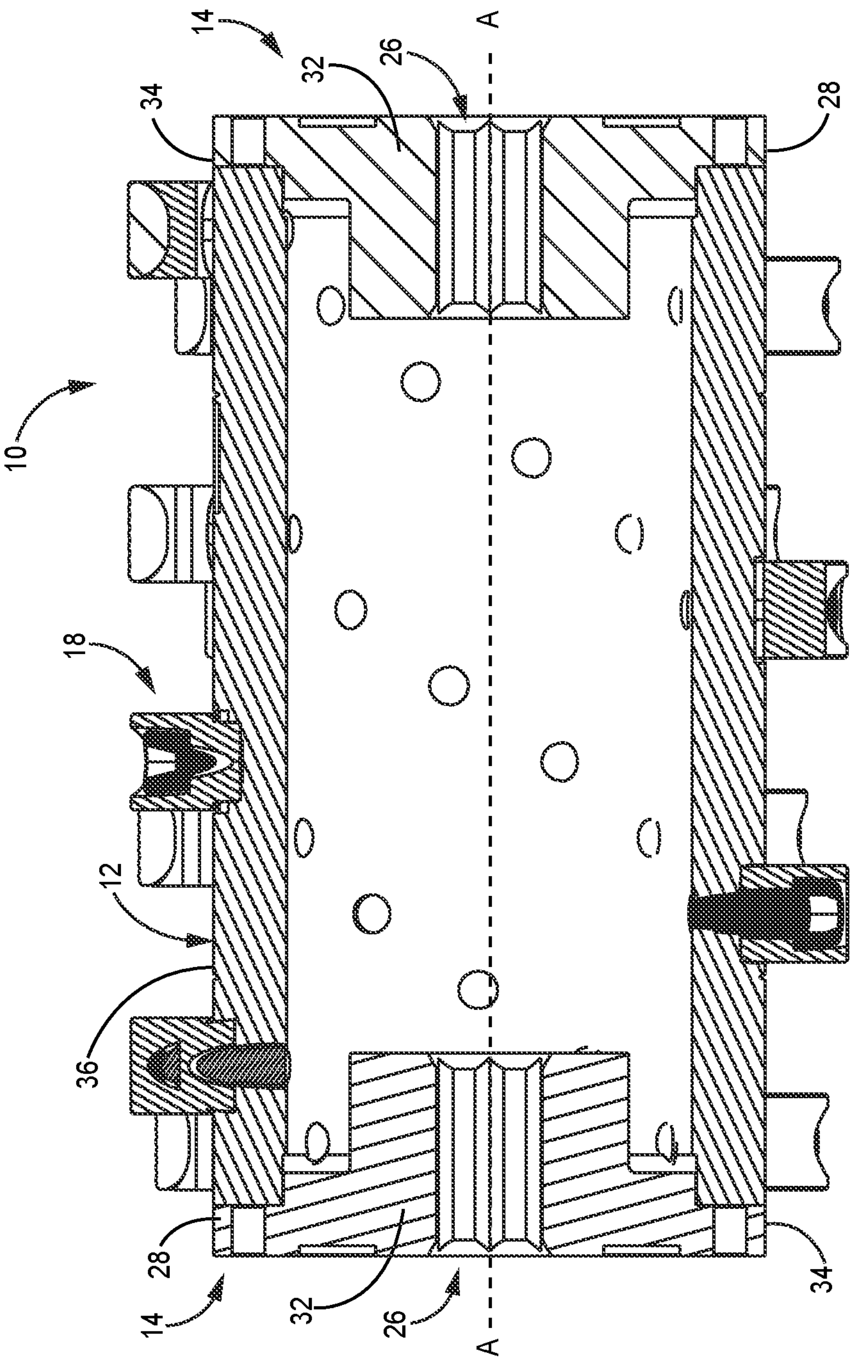
FIG. 2 is a cross-sectional view taken along line 2-2 in FIG. 1A.

FIG. 2 is a cross-sectional view taken along line 2-2 in FIG. 1A. Mounting tube 12, end hubs 14, and bit mountings 18 of grinding drum 10 are shown. End hubs 14 include shaft bore 26, hub flange 28, and hub body 32.

Mounting tube 12 is elongate along axis A-A. Bit mountings 18 are mounted to mounting tube 12 and supported by mounting tube 12. End hubs 14 are disposed at opposite axial ends of mounting tube 12. End hubs 14 are fixed to mounting tube 12 to convey rotational motion to mounting tube 12.

Each end hub 14 includes a shaft bore 26 extending fully axially through the end hub 14. The shaft bore 26 extends axially through the hub body 32 and is aligned on axis A-A. The shaft bore 26 is configured to receive a drive shaft of a grinding machine. In some examples, the end hubs 14 have a common configuration such that each end hub 14 can be mounted to either axial end of mounting tube 12. Such a configuration reduces part count as only a single configuration of end hub 14 is needed, providing for simple and easy assembly of grinding drum 10.

The end hubs 14 are configured to interface with the drive shaft of the pavement grinding machine and with mounting tube 12. The end hubs 14 are directly connected to drive shaft and are directly connected to mounting tube 12. Mounting tube 12, which is the component of grinding drum 10 that supports bit mountings 18, is not directly connected to the drive shaft. Mounting tube 12 does not itself interface with the drive shaft to receive rotational output from the drive shaft. Grinding drum 10 is configured such that the component supporting the bits 22 is not directly interfaced with the drive shaft. Instead, the mounting tube 12 receives rotational output from the drive shaft via the end hubs 14. Such a configuration provides for a more robust grinding drum 10. For example, if the fit between the drive shaft and end hub 14 develops some play, then the end hub 14 can be replaced without having to discard the bits 22 themselves, reducing cost and providing for a simpler and more efficient repair.

Hub flange 28 projects radially outward from hub body 32. The hub flange 28 extends to axially overlap with mounting tube 12. In the example shown, the hub edge 34 of the end hubs 14 does not extend radially outward of the outer surface 36 of the mounting tube 12. The hub edge 34 is the radially outer surface of the end hub 14. The hub edge 34 is a radially outer edge of the hub flange 28 in the example shown. The end hubs 14 not extending radially outward of the outer surface 36 can protect the end hubs 14 by positioning the end hubs 14 further from the hardened surface that is being ground. In the example shown, the end hubs 14 do not interface with any bit mounting 18 to secure the bit mounting 18 on the mounting tube 12. The bit mountings 18 do not directly interface with the end hubs 14 such that mounting tube 12 takes the forces exerted on bit mountings 18 during grinding, further protecting end hubs 14 and providing for balanced loading between the drive shaft and end hubs 14.

End hubs 14 project into mounting tube 12 such that at least a portion of each end hub 14 is radially overlapped by the mounting tube 12 relative to axis A-A. In the example shown, the hub bodies 32 of each end hub 14 extend towards each other but do not contact each other. As such, a portion of the drive shaft that extends within mounting tube 12 is not disposed within either end hub 14. The end hubs 14 are spaced such that the drive shaft bridges between the two end hubs 14.

In the example shown, the hub body 32 of each end hub 14 extends into the mounting tube 12 such that the hub body 32 radially overlaps with at least one bit mounting 18 supported by the mounting tube 12. As such, a first subset of the bit mountings 18, which subset can include one or more bit mountings 18, radially overlaps with a first end hub 14 and a second subset of the bit mountings 18, which subset can include one or more bit mountings 18, radially overlaps with a second end hub 14. In the example shown, a third subset of bit mountings disposed axially between the first and second subsets does not radially overlap with either the first or second end hub 14. In the example shown, each end hub 14 radially overlaps with fewer than all of the bit mountings 18 supported by the mounting tube 12.

Figure 3:
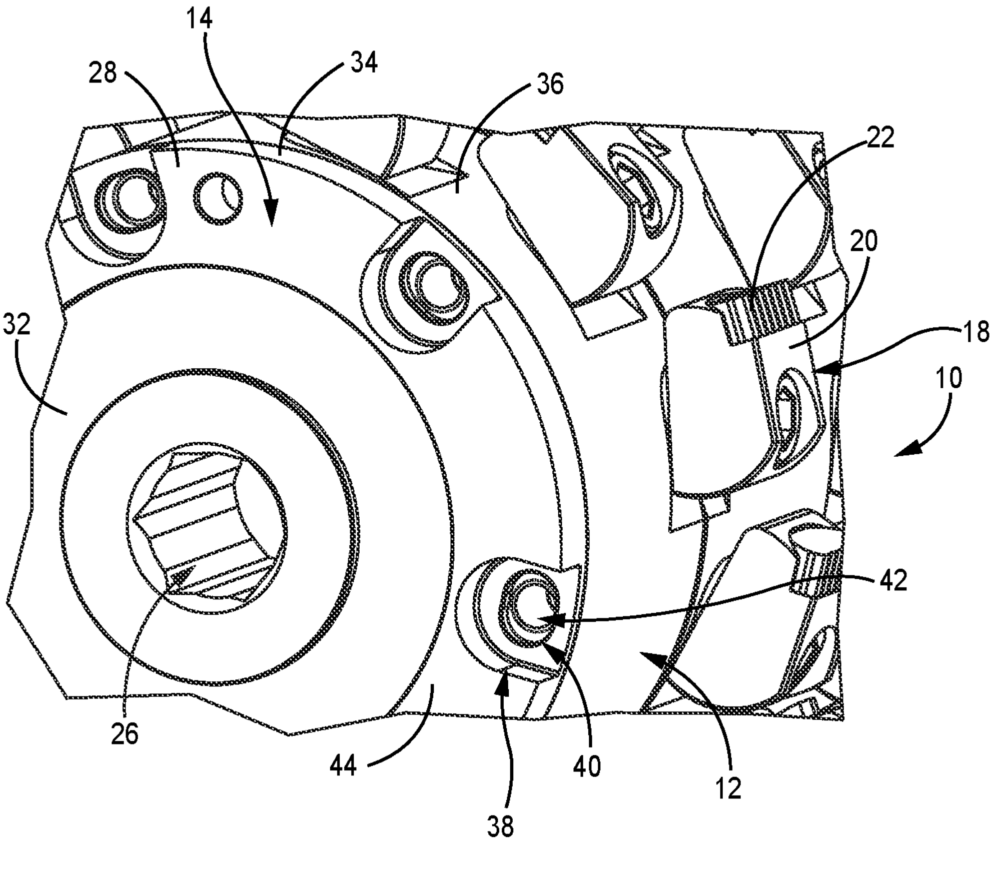
FIG. 3 is an enlarged isometric view of an exterior of a grinder drum with bit mounting dismounted.

FIG. 3 is an enlarged isometric view of an axial end of grinding drum 10 showing an end hub 14 positioned on the mounting tube 12 but with hub fasteners 16 removed for clarity. End hub 14 includes shaft bore 26, hub flange 28, hub body 32, hub notches 38, and hub apertures 40. Fastener bores 42 of the mounting tube 12 are shown.

End hub 14 is mounted to mounting tube 12 to convey rotational motion from a drive shaft to the mounting tube 12. Hub flange 28 extends radially outward from hub body 32 relative to axis A-A. Shaft bore 26 extends through hub body 32 and is disposed on axis A-A. Hub fasteners 16 are configured to connect end hub 14 to mounting tube 12. In the example shown, hub fasteners 16 are configured to extend through end hub 14 and into mounting tube 12 to connect end hub 14 and mounting tube 12.

Hub apertures 40 are formed through end hub 14. In the example shown, hub apertures 40 are formed through hub flange 28. Hub apertures 40 provide openings through which the hub fasteners 16 can extend to connect end hub 14 to mounting tube 12. Fastener bores 42 are formed in mounting tube 12. Fastener bores 42 are configured to receive the hub fasteners 16 extending through hub apertures 40. In some examples fastener bores 42 include interior threading configured to form a threaded interface with a threaded hub fastener 16 to secure the hub fastener 16 to the mounting tube 12.

In the example shown, hub apertures 40 are configured to allow for rotational positioning of the end hub 14 about the axis A-A during mounting. The hub apertures 40 are shaped to allow the end hub 14 to slightly rotate about the axis A-A relative to mounting tube 12 while the hub fasteners 16 extend through hub apertures 40 and into fastener bores 42 but prior to fully tightening hub fasteners 16. In the example shown, the hub apertures 40 are oblong. The hub apertures 40 are circumferentially elongated to provide rotational play between end hub 14 and mounting tube 12 during assembly. The elongated hub apertures 40 facilitate aligning the two end hubs 14 on mounting tube 12 such that the drive shaft of the grinding machine can pass through each shaft bore 26 of the two end hubs 14. The elongate hub aperture 40 provides for greater tolerance on the stacking of the end hub 14, then mounting tube 12, and then other end hub 14 together to form the body of the grinding drum 10 for mounting on the drive shaft.

In the example shown, hub notches 38 are formed in the end hubs 14. The hub notches 38 are formed on the hub flange 28 in this example. The hub notches 38 extend axially into the hub flange 28 from an axial outer face 44 of the hub flange 28. The hub aperture 40 is open through a base of the hub notch 38. In the example shown, the hub notches 38 extend to the hub edge 34 such that the hub notches 38 are open both axially away from the mounting tube 12 and radially outward from the axis A-A. The hub notches 38 can receive the heads of the hub fasteners 16 with the end hub 14 mounted to the mounting tube 12. In some examples, the hub notches 38 are configured such that no portion of the hub fastener 16 extends axially outward beyond the outer face 44 of the end hub 14. The heads of the hub fasteners 16 being disposed in the hub notches 38 protect the hub fasteners 16, such as from ground hardened material and provide for a more axially compact grinding drum 10. The hub notches 38 being open radially as well as axially allows for easy tool access to the hub fastener 16 for assembly and disassembly.

Figure 4A:
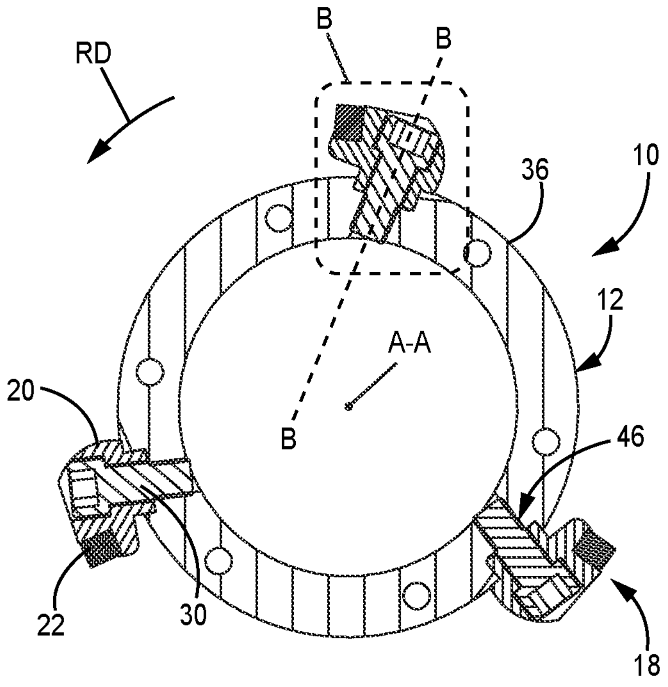
FIG. 4A is a cross-sectional view of a grinder taken along line 4-4 in FIG. 1A showing a bit mounting mounted to a grinder drum.
Figure 4B:
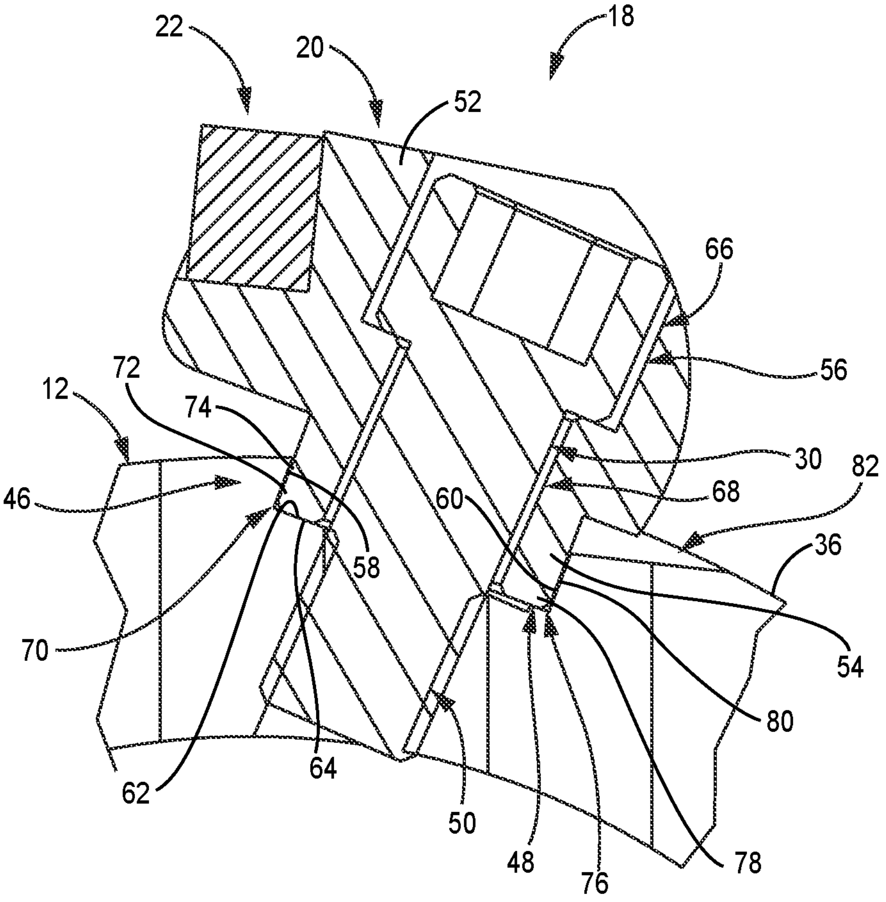
FIG. 4B is an enlarged view of detail B in FIG. 4A.

FIG. 4A is a cross-sectional view taken along line 4-4 in FIG. 1A. FIG. 4B is an enlarged view of detail B in FIG. 4A. FIGS. 4A and 4B are discussed together. Mounting tube 12 includes bit mounting receivers 46. Each bit mounting receiver 46 includes outer recess 48 and inner receiver 50. Bit mounting 18 includes bit holder 20 and bit 22. Bit holder 20 includes head 52 and stem 54. Holder bore 56 is formed in bit holder 20.

The axis A-A is aligned with the views shown in FIGS. 4A and 4B. As shown, a plurality of bit mounting receivers 46 are arrayed around the mounting tube 12. The bit mounting receivers 46 extend entirely radially through the mounting tube 12 in the example shown. The bit mounting receivers 46 extend through the mounting tube 12 and are open on an outer side of the mounting tube 12 and an inner side of the mounting tube 12. Each bit mounting receiver 46 can be machined into the mounting tube 12, among other options. In some examples, each bit mounting receiver 46 is defined by one contiguous piece of metal that forms the mounting tube 12. In various other examples, insert pieces can define one or more parts of the bit mounting receiver 46. Each bit mounting receiver 46 is formed from an outer recess 48 and an inner receiver 50. The outer recess 48 is wider than the inner receiver 50 in the example shown. The outer recess 48 is wide enough to accommodate a stem 54 of the bit holder 20 whereas the inner receiver 50 is dimensioned to contain a narrower mount fastener 30.

Bit mounting receiver 46 extends along a mount axis B-B. The mount axis B-B is canted such that the mount axis B-B does not extend directly radially outward from axis A-A. The axis B-B does not intersect the axis A-A. Bit mounting receiver 46 is configured such that the axis B-B is not aligned with the axis A-A. For example, axis B-B would not intersect with the axis A-A if the axis B-B were projected to extend past and beyond axis A-A.

Outer recess 48 includes leading wall 58, trailing wall 60, and rim floor 62. Leading wall 58 is disposed at a first end of outer recess 48 relative to the rotational direction of grinding drum 10 and trailing wall 60 is disposed at a second end of outer recess 48 relative to the rotational direction of grinding drum 10. The grinding drum 10 is configured to rotate in direction RD such that leading wall 58 is a leading portion of outer recess 48 during rotation and trailing wall 60 is a trailing portion of outer recess 48 during rotation. Rim floor 62 forms a base of the outer recess 48. The inner receiver 50 is open through the rim floor 62 and to the outer recess 48. Rim floor 62 extends between the leading wall 58 and the trailing wall 60. A stem base 64 of stem 54 can interface with rim floor 62 with bit mounting 18 mounted to mounting tube 12. In some examples, the stem base 64 can contact the rim floor 62 with bit mounting 18 mounted to mounting tube 12.

As shown, the bit holder 20 has a head 52 which is wider than the stem 54, the head 52 being located radially outward with respect to the stem 54. As used herein, radially refers to being closer or farther away relative to the axis A-A, wherein radially inward is closer to the axis A-A and radially outward is farther away from the axis A-A. Bit 22 is supported by bit holder 20. Bit 22 is disposed at a location that is spaced radially away from mounting tube 12. Bit mountings 18 are mounted to mounting tube 12 such that bit 22 forms a portion of bit mounting 18 that is disposed radially furthest from the axis A-A. Such a configuration facilitates the bit 22 impacting and grinding the hardened surface while protecting bit holder 20 from directly impacting the hardened surface.

Mount fastener 30 connects bit mounting 18 to mounting tube 12. In the example shown, mount fastener 30 extends fully through bit holder 20 to interface with mounting tube 12. The mount fastener 30 can be configured as a bolt, among other options.

In the example shown, bit holder 20 includes holder bore 56. The mount fastener 30 extends through the holder bore 56 and further extends out of bit holder 20 and into the mounting tube 12. The mount fastener 30 can thread into an aperture (e.g., inner receiver 50) within the mounting tube 12 to fix the bit holder 20 onto the mounting tube 12. The holder bore 56 is a passage formed entirely through the bit holder 20 having a radially inward opening and a radially outward opening through which a mount fastener 30 can extend to attach the bit holder 20 to the mounting tube 12.

In the example shown, the holder bore 56 includes head portion 66 and shaft portion 68. Head portion 66 is disposed radially outward from the shaft portion 68. Head portion 66 is formed in head 52 of bit holder 20. Head portion 66 can be dimensioned such that the head of the mount fastener 30 is recessed from the exterior surfaces of the bit holder 20 by being disposed within head portion 66. Recessing the head of the mount fastener 30 prevents the mount fastener 30 from inadvertently contacting the hardened surface during operation, which could damage the mount fastener 30, bit mounting 18, or mounting tube 12. The narrower threaded portion of the mount fastener 30 extends through the shaft portion 68 and out of the bit holder 20 to interface with the mounting tube 12. For example, the inner receiver 50 of bit mounting receiver 46 can include interior threading configured to engage with the exterior threading on the shaft of the mount fastener 30. In the example shown, the larger portion of the mount fastener 30 is received in the head 52 of the bit holder 20 whereas the narrower threaded portion of the mount fastener 30 extends through the stem 54 and into the inner receiver 50 of the bit mounting receiver 46. In the example shown the bit holder 20 does not include threading that interfaces with the mount fastener 30. Instead, the mount fastener 30 passes through the bit holder 20 to threadedly interface with the mounting tube 12.

Mount fastener 30 is orientated along an axis B-B. The axis B-B extends coaxially through the mount fastener 30. The axis B-B also extends coaxially with the cylindrical profile of the inner receiver 50. It is noted that the axis B-B may not extend coaxially with the outer recess 48 which can be asymmetric, whereas the inner receiver 50 may be symmetric or otherwise generally cylindrical. In this way, the mount fastener 30 is not aligned with the axis A-A of the mounting tube 12. It has been found that angling of the axis B-B of the mount fastener 30 relative to the axis A-A of the mounting tube 12 can increase the holding force of the bit mounting 18 when grinding. For example, reactionary forces during grinding may want to pull the bit mounting 18 directly radially out from the bit mounting receiver 46 relative to the rotational axis of the grinding drum 10, but angling the bit mounting receiver 46, including the inner receiver 50, provides more resistance to such radial pulling force to help maintain the bit mounting 18 in place on the mounting tube 12 as the pavement grinding drum 10 rotates as indicated by rotational indicator RD. The bit 22 can be the leading surface of the bit mounting 18 while a radially inward part of the mount fastener 30 leads relative to a radially outward part of the mount fastener 30 due to the angling of the mount fastener 30.

As shown, the mount fastener 30 is configured such that the radially inner portion of the mount fastener 30 is disposed forward of the radially outer portion of the mount fastener 30 relative to the direction of rotation RD. The mount fastener 30 can extend to radially overlap with the bit 22 of the bit mounting 18 that mount fastener 30 secures to mounting tube 12. The mount fastener 30 is canted in the direction of rotation RD from radially outward towards radially inward relative to axis A-A. As noted above, the canted configuration of the mount fastener 30 provides a strong hold on the bit mounting 18 to maintain the bit mounting 18 on mounting tube 12.

The mount fastener 30 engages with the bit holder 20 at a trailing location relative to the bit 22 to hold the bit mounting 18 on the mounting tube 12. In the example shown, the engagement is between the head of the mount fastener 30 and a portion of bit holder 20 forming a floor of the head portion 66 of the holder bore 56. The engagement between mount fastener 30 and bit holder 20 being rearward of the bit 22 relative to the direction of rotation RD can assist in positioning bit 22 for grinding operations.

In the example shown, the holder bore 56 of the bit holder 20 is open radially outwards and radially inwards. The radially outer opening of the holder bore 56 is disposed rearward of the bit 22 relative to the direction of rotation RD of the grinding drum 10. In the example shown, both the radially inner and outer openings of the holder bore 56 are disposed rearward of the bit 22 relative to the direction of rotation RD of the grinding drum 10. At least a portion of the mount fastener 30 is disposed at a trailing position relative to the bit 22. The mount fastener 30 trailing the bit 22 can protect the mount fastener 30 from undesired contact with the hardened material or chips of the hardened material.

Bit mounting receiver 46 includes a leading inner notch 70 in the example shown. The leading inner notch 70 is formed by the leading wall 58 and the rim floor 62 of the bit mounting receiver 46. The stem 54 can engage the leading wall 58 and the rim floor 62 to help secure the bit holder 20. As shown, the stem 54 includes a leading corner 72 which presses into the leading inner notch 70. The result is that part of the metal material of the mounting tube 12, defined at least in part by the leading wall 58, is directly radially above the leading corner 72 with respect to axis A-A, which then resists radial force relative to axis A-A that may pull the bit mounting 18 directly radially outward in reaction to grinding. In the example shown, a radial line extending from axis A-A will pass first through material of the mounting tube 12, then through the portion of stem 54 disposed within the leading inner notch 70, and then again through material of mounting tube 12 before passing radially outward of mounting tube 12. Material of mounting tube 12 can be considered to radially overlap, with respect to axis A-A, stem 54 both radially inward (e.g., by rim floor 62) and radially outward (e.g., by leading wall 58). The mount fastener 30 can wedge the leading corner 72 into the leading inner notch 70 to resist the bit mounting 18 from being pulled directly radially outward.

Where the bit mounting 18 is tugged directly radially outward relative to axis A-A when grinding, the leading corner 72 being disposed within the leading inner notch 70 resists the bit mounting 18 from being pulled out from the bit mounting receiver 46. This is due at least in part to the engagement between the leading surface 74 of the stem 54 engaging with the leading wall 58 of the outer recess 48, and the leading surface 74 being radially inward of the leading wall 58 to radially overlap with the leading wall 58 relative to axis A-A.

The stem 54 further includes a trailing surface 80 which engages with a trailing wall 60 of the outer recess 48. Each of the leading surface 74, the leading wall 58, the trailing surface 80, and the trailing wall 60 are angled relative to the axis A-A, which resists a normal force vector directly radially outward from axis A-A from pulling the bit holder 20 out from the bit mounting receiver 46 during grinding. As such, in the example shown the bit mounting 18 is retained radially on mounting tube 12 by both the mount fastener 30 and by mounting tube 12 itself.

As shown, the bit holder 20 includes a trailing corner 78. The trailing corner 78 is seated into the trailing inner notch 76 formed in the bit mounting receiver 46. The trailing inner notch 76 is formed between rim floor 62 and trailing wall 60. The trailing corner 78 being disposed within the trailing inner notch 76 helps resist tangential loads brought upon by the bit 22 engaging pavement during grinding, helping secure the bit holder 20 in the bit mounting receiver 46.

In the example shown, the leading wall 58 of the outer recess 48 is shorter than the trailing wall 60 of the outer recess 48. The trailing wall 60 extends further from rim floor 62 than leading wall 58. The different heights of the leading wall 58 and trailing wall 60 facilitate capture of the stem 54 within the outer recess 48. As discussed above, leading wall 58 can extend over a portion of stem 54 to radially overlap with stem 54 relative to axis A-A. Such overlap prevents the bit holder 20 from being pulled directly radially outward relative to axis A-A. The different heights of the leading wall 58 and trailing wall 60 further facilitate the canted mounting of the bit mounting 18 on the mounting tube 12. The bit mounting receiver 46 extends into the mounting tube 12 from a cylindrical exterior outer surface 36 of the mounting tube 12. The different height leading wall 58 and trailing wall 60 facilitate the bit holder 20 sitting on the rim floor 62 such that the axis B-B is offset from and not directly aligned with the axis A-A.

In the example shown, slot 82 is formed in the outer surface 36 of the mounting tube 12. The slot 82 leads into the outer recess 48 from a trailing side of the outer recess 48. In some examples, a portion of bit holder 20 can extend into the slot 82 to be disposed within the slot 82. Slot 82 provides an open area to prevent the trailing end of bit holder 20 from contacting mounting tube 12 during operation. The trailing side of bit holder 20 is spaced radially outward from the base of slot 82 to maintain the gap therebetween even as bit 22 contacts the hardened surface during operation.

Figure 5:
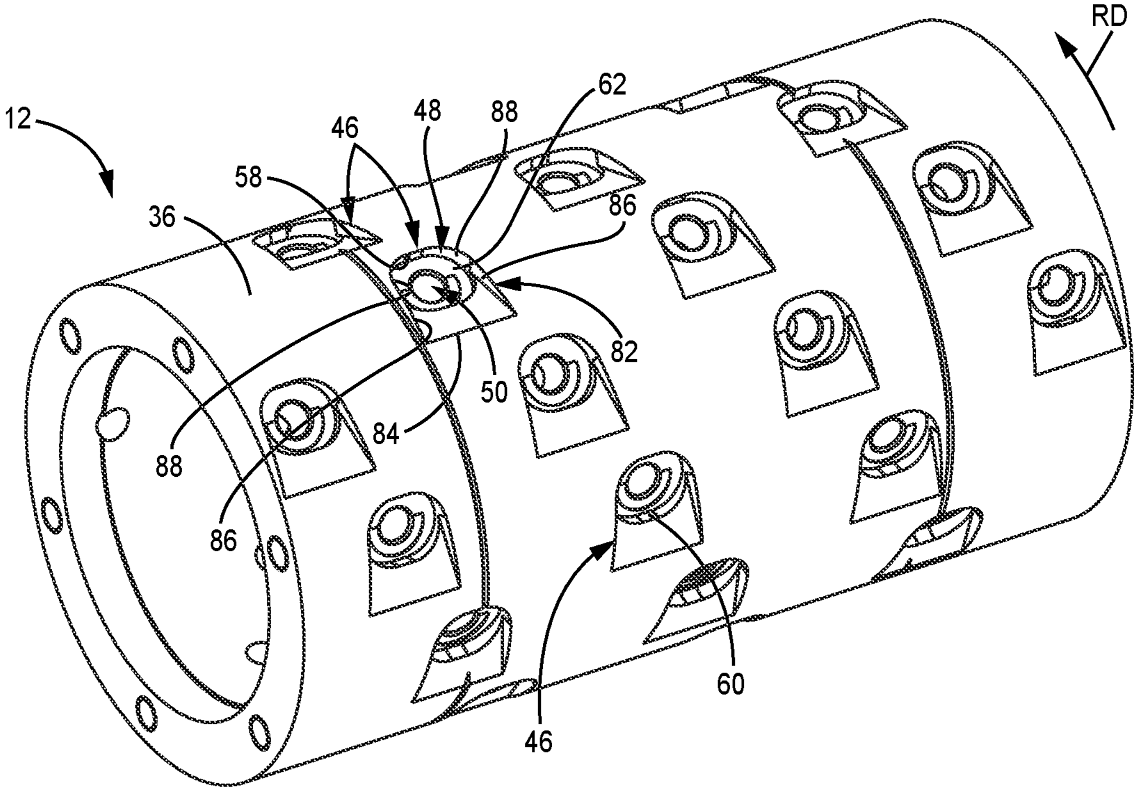
FIG. 5 is an isometric view of a mounting tube of a grinding drum.

FIG. 5 is an isometric view of mounting tube 12. Bit mounting receivers 46 are formed in mounting tube 12. Outer recess 48 extends into the body of mounting tube 12 from outer surface 36 of mounting tube 12. Inner receiver 50 extends further into the body of mounting tube 12 from outer recess 48. Inner receiver 50 can extend fully through mounting tube 12 such that inner receiver 50 is open to an interior of mounting tube 12 and is open to outer recess 48. As discussed above, outer recess 48 is configured to receive a portion of bit holder 20 (e.g., stem 54) while mount fastener 30 extends into inner receiver 50 to secure the bit mounting 18 to mounting tube 12.

Slot 82 is disposed on a trailing side of the bit mounting receiver 46. The slot 82 intersects with the bit mounting receiver 46 at the trailing side of bit mounting receiver 46. The slot 82 can extend between the trailing wall 60 and out to the outer surface 36 of the mounting tube 12. The slot 82 can extend a full width of the outer recess 48, such as a full width taken axially relative to axis A-A. In the example shown, the mounting tube 12 does not include such a slot that runs the full width of the outer recess 48 on the leading side of the bit mounting receiver 46, though it is understood that not all examples are so limited. Slot 82 allows the bit holder 20 to be slid from the trailing side into place, which may be helpful when mounting each bit mounting 18 in place one by one in sequence so that the leading corner 72 can be entered into the leading inner notch 70.

Slot 82 further protects bit mounting 18 during operation. Slot 82 provides a recess into the exterior of mounting tube 12 that spaces the lower side of head 52 from the mounting tube 12. Such spacing prevents contact between the bit mounting 18 and the exterior of mounting tube 12, protecting both the bit holder 20 and the mounting tube 12 from contact damage. The spacing further facilitates mounting of bit mounting 18 at an angle, such as along the canted axis B-B, providing for a more robust configuration of grinding drum 10.

In the example shown, the slot 82 is sloped between outer recess 48 and outer surface 36 of mounting tube 12. The slot 82 is deepest at outer recess 48 and a depth of the slot decreases to the slot end 84 at the outer surface 36. The slot 82 extends furthest into mounting tube 12 at an intersection between slot 82 and bit mounting receiver 46. In the example shown, the slot 82 has a variable width along axis A-A as the slot 82 extends between the outer recess 48 and slot end 84. The width of the slot 82 is taken between the slot sides 86. In the example shown, the width of the slot 82 increases as slot 82 moves further away from outer recess 48. In the example shown, the slot width is greatest at slot end 84 and smallest at outer recess 48. The variable slot width can assist in guiding of a bit mounting 18 into the bit mounting receiver 46 during assembly.

As shown, the outer recess 48 includes the leading wall 58, trailing wall 60, rim floor 62 and side walls 88. Leading wall 58, trailing wall 60, and side walls 88 extend outward from rim floor 62 towards the outer surface 36. In the example shown, leading wall 58 extends from rim floor 62 to outer surface 36. In the example shown, the trailing wall 60 extends from the rim floor 62 to the slot 82. The trailing wall 60 does not extend to the outer surface 36 in the example shown.

The side walls 88 extend between the leading wall 58 and the trailing wall 60. In the example shown, the outer recess 48 is non-circular. The outer recess 48 is contoured to provide an anti-rotation interface with stem 54. Stem 54 is contoured to mate with the contoured outer recess 48 such that the interface between stem 54 and the walls of outer recess 48 prevents bit mounting 18 from rotating within the outer recess 48. Such a configuration maintains desired orientation for the bit 22 during grinding, providing smooth and even grinding by grinding drum 10.

In the example shown, leading wall 58 and trailing wall 60 are flat walls. The side walls 88 are curved between the leading wall 58 and the trailing wall 60. The flat leading wall 58 and trailing wall 60 are configured to interface with surfaces of the stem 54 to prevent rotation of the stem 54 within the outer recess 48, such as on axis B-B. In the example shown, outer recess 48 can be considered to be an ovular recess, though it is understood that other non-circular shapes are possible. It is understood that, in some examples, only one of the leading wall 58 and trailing wall 60 is flat to interface with a corresponding flat on the bit holder 20. Further, while outer recess 48 is described as ovular, it is understood that outer recess 48 can be of any non-circular shape for interfacing with stem 54 and preventing rotation of the bit holder 20.

Bit mounting receivers 46 provide significant advantages. The bit mounting receivers 46 each provide a location for a single bit mounting 18 to be mounted to the mounting tube 12. The bit mountings 18 can be individually mounted and dismounted from mounting tube 12. Bit mounting receiver 46 extends into mounting tube 12 such that at least a portion of the bit mounting 18 is recessed within mounting tube 12 and below outer surface 36 with the bit mounting 18 attached to mounting tube 12. The bit mounting 18 extending at least partially into mounting tube 12 provides a robust connection that inhibits detachment of the bit mounting 18 from the mounting tube 12. Further, bit mounting receiver 46 is configured to interface with the bit mounting 18 to maintain the bit mounting 18 in a desired orientation for grinding, providing for smooth and even grinding. Slot 82 extends from bit mounting receiver 46 and can assist in installation of a bit mounting 18 by guiding the leading corner 72 of the bit holder 20 into the leading inner notch 70. Further, the slot 82 provides a gap between the exterior of mounting tube 12 and bit holder 20 to prevent undesired contact therebetween during grinding operations.

Figure 6:
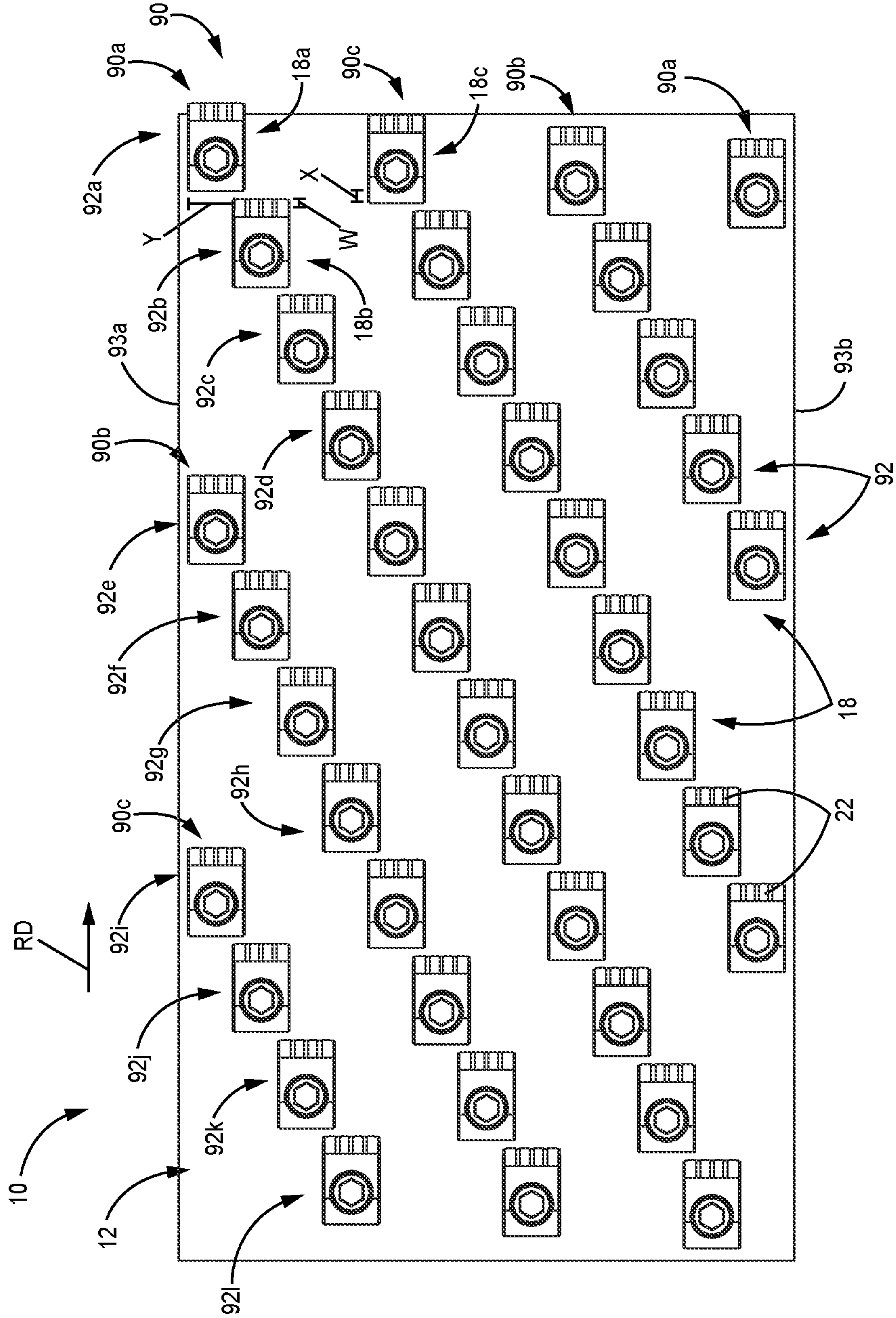
FIG. 6 is a view of a grinder drum showing the mounting tube having been axially unrolled and then flattened to show a mounting arrangement of bit mountings.

FIG. 6 shows a view of the grinding drum 10 with the mounting tube 12 having been unrolled and then flattened. It will be understood that the view of FIG. 6 is not possible with physical embodiments but rather is made to demonstrate the pattern of the bit mountings 18 on the mounting tube 12.

As shown, the bit mountings 18 are arranged in bit mounting arrays 90. In the example shown, the grinding drum 10 includes bit mounting arrays 90*a*, 90*b*, 90*c* (collectively referred to herein as "bit mounting array 90" or "bit mounting arrays 90"). Each bit mounting array 90 spirals at least partially around the circumference of the mounting tube 12. Each bit mounting array 90 extends both longitudinally (e.g., axially relative to axis A-A) and laterally (e.g., circumferentially) on mounting tube 12. In the example shown, each bit mounting array 90 wraps fully about the mounting tube 12. As such, bit mounting 18 of bit mounting array 90*a* closest to tube end 93*a* of mounting tube 12 axially overlaps with the bit mounting 18 of bit mounting array 90*a* closest to tube end 93*b*. It is understood, however, that not all examples are so limited. In some examples, a single bit mounting array 90 can wrap less than 360-degrees about mounting tube 12. In some examples, a single bit mounting array 90 can wrap at least 360-degrees about mounting tube 12. In the example shown, a pair of the bit mountings 18 of each bit mounting array 90 axially overlap with each other. It is understood that in various other examples more or less than one pair of bit mountings 18 of a single bit mounting array 90 can axially overlap with each other. In some examples, more than two bit mountings 18 of a single bit mounting array 90 can axially overlap with each other. For example, a single bit mounting array 90 can wrap more than 720-degrees about mounting tube 12. While grinding drum 10 is shown as including multiple bit mounting arrays 90, it is understood that not all examples are so limited. For example, grinding drum 10 can include a single bit mounting array that wraps about the mounting tube 12.

The bit mountings 18 are further arranged in bit mounting rows 92. In the example shown, the grinding drum 10 includes bit mounting rows 92*a*-92*l* (collectively referred to herein as "bit mounting row 92" or "bit mounting rows 92"). Each bit mounting row 92 extends both longitudinally (e.g., axially relative to axis A-A) and laterally (e.g., circumferentially) on mounting tube 12. In the example shown, each bit mounting row 92 wraps less than fully about the mounting tube 12. In the example shown, each bit mounting row 92 includes bit mountings 18 from multiple of the bit mounting arrays 90. In the example shown, each bit mounting row 92 includes at least one bit mounting 18 from each bit mounting array 90 of the multiple bit mounting arrays 90, though it is understood that not all examples are so limited. In the example shown, one or more of the bit mounting rows 92 includes multiple bit mountings 18 from the same bit mounting array 90. As shown, bit mounting rows 92*a*, 92*c*, and 92*i* each include multiple bit mountings 18 from a single bit mounting array 90.

As shown, the bit mounting rows 92 can include the same or different numbers of bit mountings 18 as compared to others of the bit mounting rows 92. It is understood that in some examples each bit mounting row 92 can include the same count of bit mountings 18 as the other bit mounting rows 92. In the example shown, a majority of the bit mounting rows 92 have a first count of bit mountings 18 and a minority of the bit mounting rows 92 have a second count of bit mountings 18. In the example shown, the first count is less than the second count, though it is understood that not all examples are so limited.

In the example shown, the bit mountings 18 within a bit mounting array 90 are paired front to back such that the bit mountings 18 within each bit mounting array 90 overlap by a small amount. For example, one pair within bit mounting array 90*a* comprises bit mountings 18*a*, 18*b*, which are partially overlapping from a leading perspective but are nevertheless offset axially by amount Y. That amount Y allows a mismatch between lobes of the respective bits 22 of the pair of bit mountings 18*a*, 18*b*. As such, each bit 22 can be the same for all of the bit mountings 18, including by having a plurality of lobes, and offset by Y between the pairs of bit mountings 18 within a bit mounting array 90 allows a mismatch between the lobes of the bits 22 such that an aggregate of the lobes of the pair when moving over a common surface aggregate form a straighter cutting surface for a smooth finish on the pavement than a single lobed bit. It will be understood that lobed bits 22 cut better than flat bits 22, yet a flat smooth surface is desired. Offsetting the pairs allows the bits 22 to work together to provide a smooth surface while themselves each being lobed.

In the example shown, the bit mounting arrays 90 extend both axially and circumferentially along the mounting tube 12. The bit mounting arrays 90 can be considered to spiral around the mounting tube 12. Each bit mounting array 90 can be considered to extend helically about the mounting tube 12. In the example shown, the bit mountings 18 of a bit mounting array 90 are disposed such that a leading bit mounting 18 partially overlaps and is partially offset from a trailing bit mounting 18 within the same bit mounting array 90. In the example shown, the pair of bit mountings 18*a*, 18*b* is formed by laterally adjacent bit mountings 18 of bit mounting array 90*a*. The pair of bit mountings 18*a*, 18*b* circumferentially overlap with each other but do not axially overlap with each other, in the example shown.

Bit mounting rows 92 are formed by bit mountings 18 of multiple bit mounting arrays 90. Some bit mounting rows 92 can include multiple bit mountings 18 from within a single bit mounting array 90. A longitudinal direction can be considered to be taken along axis A-A. The longitudinally adjacent bit mountings 18 within a bit mounting row 92 (e.g., bit mounting 18*a* of bit mounting array 90*a* and bit mounting 18*c* of bit mounting array 90*c*) are partially overlapping from an axial perspective but are offset circumferentially by amount X, as shown between bit mountings 18*a*, 18*c*. The amount X of the offset facilitates at least one bit 22 being in contact with the hardened surface during operation. Maintaining a bit 22 in contact with the hardened surface can reduce vibration experienced during grinding.

The offset Y is between bit mountings 18 of a single bit mounting array 90. The offset Y is between laterally adjacent bit mountings 18 within a bit mounting array 90. The laterally adjacent bit mountings 18 within a bit mounting array 90 are disposed such that those laterally adjacent bit mountings 18 are circumferentially overlapped but do not axially overlap, in the example shown. The offset X is between bit mountings 18 of a single bit mounting row 92. The offset X is between longitudinally adjacent bit mountings 18 within a bit mounting row 92. The longitudinally adjacent bit mountings 18 within a bit mounting row 92 are disposed such that those longitudinally adjacent bit mountings are axially overlapped but do not circumferentially overlap, in the example shown.

In the example shown, the bit mountings 18 of circumferentially adjacent bit mounting rows 92 are offset by distance W (e.g., as shown between bit mounting 18*b* and bit mounting 18*c*). The offset W positions bit mountings 18 of circumferentially adjacent bit mounting rows 92 to minimize gaps between one bit mounting row 92 contacting the hardened surface and then another bit mounting row 92 contacting the hardened surface. Such overlap can reduce vibration and provide for smoother grinding operation.

Figure 7A:
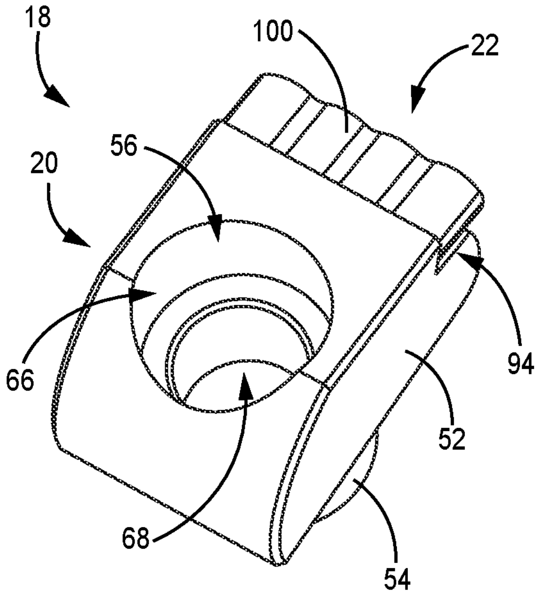
FIG. 7A is a first isometric view of a bit mounting.
Figure 7B:
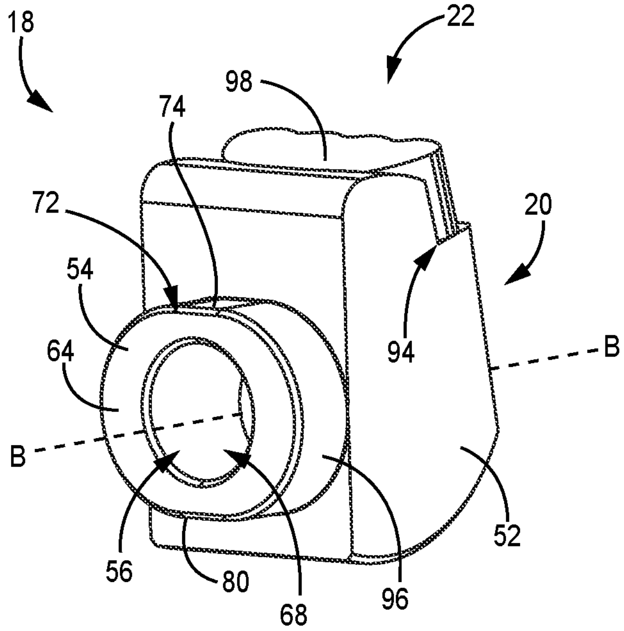
FIG. 7B is a second isometric view of a bit mounting.
Figure 7C:
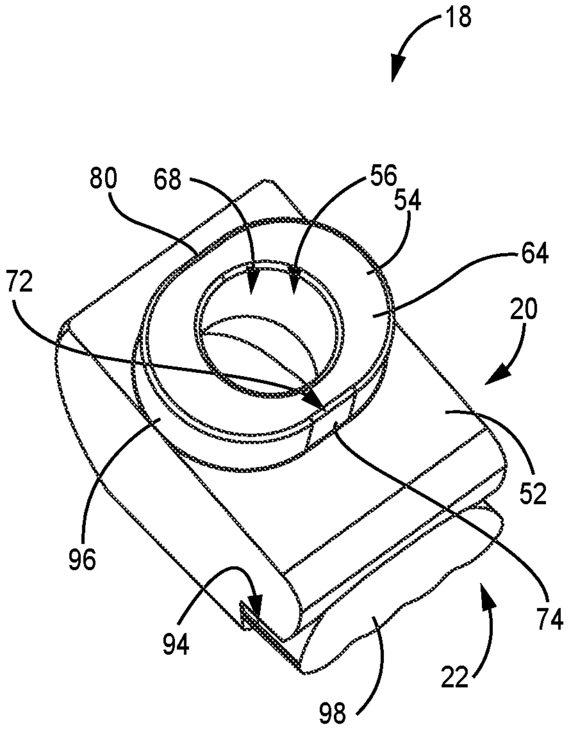
FIG. 7C is a third isometric view of a bit mounting.
Figure 7D:
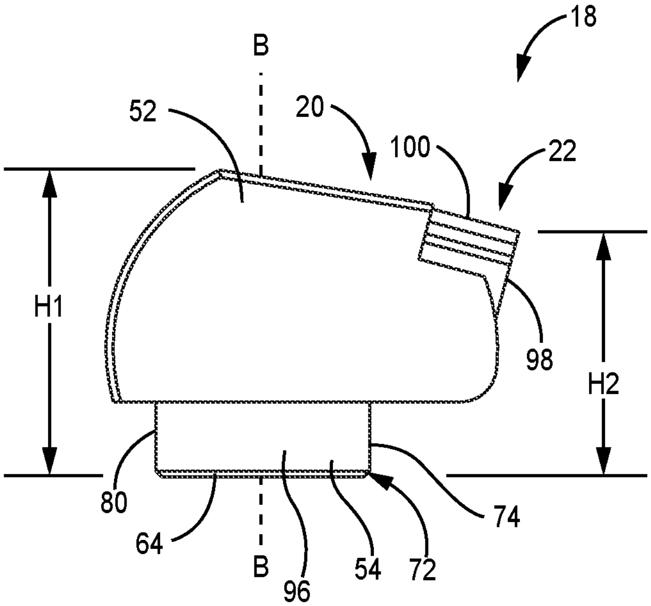
FIG. 7D is a side elevation view of a bit mounting.

FIG. 7A is a first isometric view of bit mounting 18. FIG. 7B is a second isometric view of bit mounting 18. FIG. 7C is a third isometric view of bit mounting 18. FIG. 7D is a side elevational view of bit mounting 18. FIGS. 7A-7D are discussed together. Bit holder 20 includes head 52 and stem 54. Head 52 includes bit notch 94. Stem 54 includes stem base 64, leading surface 74, trailing surface 80, and side surfaces 96.

Bit holder 20 is configured to mount to mounting tube 12 and support bit 22. Bit mounting 18 is mountable to and removable from mounting tube 12 as a single unit. Each of bit mountings 18 of grinding drum 10 can be individually installed, removed, and replaced to service or reconfigure the grinding drum 10. For example, if a bit 22 becomes worn, then the bit mounting 18 of that worn bit 22 can be replaced without removing or replacing any other bits 22 or bit mountings 18. In an additional or alternative example, the user can reconfigure grinding drum 10 to change a grind width of the grinding drum 10 by removing or adding bit mountings 18 to the mounting tube 12. The user can thereby reconfigure grinding drum 10 to different widths by simply removing or adding bit mountings 18, providing for quick and efficient modification. Such modification can be performed without removing grinding drum 10 from a drive shaft, unlike bits that are supported by plates that are individually mounted to the drive shaft.

Head 52 supports bit 22. Head 52 can be mostly or fully disposed outside of mounting tube 12 with bit mounting 18 fixed to mounting tube 12. In the example shown, head 52 includes bit notch 94 formed at a leading end of head 52. The bit 22 is disposed in the bit notch 94. The bit 22 is mounted to head 52 such that a leading face 98 and outer face 100 of bit 22 are exposed. In the example shown, the sides of the bit 22 are also exposed.

Stem 54 extends from head 52. Stem 54 has a smaller cross-sectional area than head 52 taken orthogonal to axis B-B. Stem 54 is configured to extend into mounting tube 12 to mount bit mounting 18 to mounting tube 12. The stem 54 is at least partially disposed within mounting tube 12 with bit mounting 18 mounted to mounting tube 12. The side surfaces 96, leading surface 74, and trailing surface 80 form a radial exterior of stem 54 relative to axis B-B. The side surfaces 96 extend between the leading surface 74 and the trailing surface 80. Stem base 64 of stem 54 is disposed at an end of stem 54 opposite head 52.

Leading corner 72 is disposed between leading wall 58 and stem base 64. Leading corner 72 is configured to be disposed within leading inner notch 70 to assist in retaining bit mounting 18 on mounting tube 12.

In the example shown, the exterior of the stem 54 is non-circular. The stem 54 is contoured to provide an anti-rotation interface with bit mounting receiver 46. The contoured stem 54 is contoured to mate with the outer recess 48 such that the interface between the surfaces of stem 54 and the walls of outer recess 48 prevents bit mounting 18 from rotating within the outer recess 48. Such a configuration maintains desired orientation for the bit 22 providing smooth and even grinding by grinding drum 10.

In the example shown, leading surface 74 and trailing surface 80 are flat surfaces. The side surfaces 96 are curved between the leading surface 74 and the trailing surface 80. The flat leading surface 74 and trailing surface 80 are configured to interface with walls of the outer recess 48 to prevent rotation of the stem 54 within the outer recess 48, such as on axis B-B. It is understood that in various other examples an exterior of stem 54 can include a single flat to interface within outer recess 48 and prevent relative rotation. In the example shown, stem 54 can be considered to be ovular, though it is understood that other non-circular shapes are possible.

Holder bore 56 is formed within bit holder 20. Holder bore 56 extends along axis B-B. Holder bore 56 extends fully through bit holder 20 in the example shown. Head portion 66 of holder bore 56 is formed in head 52. Head portion 66 extends into head 52 from a top side of head 52. Shaft portion 68 extends from head portion 66 and through stem 54. Head portion 66 is wider than shaft portion 68. Head portion 66 is configured to receive a head of mount fastener 30 such that the head of the mount fastener 30 is recessed within head 52.

As best seen in FIG. 7D, bit mounting 18 is configured such that bit mounting 18 has a holder height H1 and a bit height H2. The holder height H1 is a distance between a base of the stem 54 to the top of the head 52. The bit height H2 is a distance between a base of the stem 54 and the free end of the bit 22 that forms a leading edge of the bit 22. In the example shown, the holder height H1 is greater than the bit height H2. The larger holder height H1 provides for a robust bit holder 20 trailing the bit 22 to provide support for the bit 22 during operation. As discussed above, the grinding drum 10 is configured such that bit holders 20 are canted when installed on mounting tube 12. The canted mounting configuration positions the bit 22 as the portion of the bit mounting 18 spaced furthest radially outward from outer surface 36 of the mounting tube 12. Such a configuration provides for a robust bit mounting 18 while positioning the bit 22 for grinding operations.

Discussion of Non-Exclusive Examples

The following are non-exclusive descriptions of possible examples according to various aspects of the disclosure.

A grinding drum for grinding hardened material includes a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits; wherein the plurality of bit mounting receivers are disposed in at least one mounting array and wherein the at least one mounting array is disposed helically about the mounting tube.

The grinding drum of the preceding paragraph can optionally include, additionally and/or alternatively, any one or more of the following features, configurations and/or additional components:

The at least one mounting array includes a plurality of mounting arrays, and wherein each mounting array of the plurality of mounting arrays is disposed helically about the mounting tube.

The plurality of mounting arrays are disposed helically parallel with respect to each other.

Each bit of the plurality of bits has a common cutting shape with respect to each other bit of the plurality of bits.

The plurality of bit mountings are arranged so that a leading bit mounting partially overlaps and is partially offset from a trailing bit mounting.

Each bit mounting receiver of the plurality of bit mounting receivers comprises a leading inner notch into which a leading corner of the bit mounting of the plurality of bit mountings received within the bit mounting receiver is seated.

A leading wall of the leading inner notch is located directly radially outward of the leading corner such that the leading corner is located radially underneath the leading wall.

The leading corner is disposed in the leading inner notch such that the leading corner is radially overlapped by material defining the bit mounting receiver within which the bit mounting is disposed both radially inward and radially outward from the leading corner.

The leading corner is wedged into the leading inner notch to resist the bit mounting from being pulled directly radially outward.

Each bit mounting of the plurality of bit mountings is orientated offset from the tube axis.

Each bit mounting receiver of the plurality of bit mounting receivers is orientated offset from the tube axis.

Each bit mounting of the plurality of bit mountings comprises a mount fastener that extends through the bit mounting and extends into a respective bit mounting receiver.

The mount fastener is a bolt.

The mount fastener is threadedly connected to the mounting tube.

The mount fastener is angled offset from the tube axis.

The mount fastener is disposed along a mount axis and wherein the mount axis is offset from the tube axis such that the mount axis does not intersect with the tube axis.

The mount fastener is disposed behind the bit relative to a direction of rotation of the mounting tube.

The mounting tube is formed from a single contiguous piece of metal into which the plurality of bit mounting receivers are machined.

A first bit mounting of the plurality of bit mountings is mountable in any one of the plurality of bit mounting receivers.

A first bit mounting of the plurality of bit mountings is mounted to a first bit mounting receiver of the plurality of bit mounting receivers; the first bit mounting receiver comprises: an outer recess extending into the mounting tube from an exterior of the mounting tube; and an inner receiver extending into the mounting tube from the outer recess; and the first bit mounting comprises: a first bit holder supporting a first bit of the plurality of bits, the first bit holder including a stem and a head, wherein the stem is at least partially disposed in the outer recess.

A mount fastener extending through the first bit holder and engaging the mounting tube within the inner receiver.

The mount fastener is threadedly connected to the mounting tube.

A holder bore extends fully through the first bit holder along a mount axis, the mount fastener at least partially disposed in the holder bore.

At least one flat on an exterior of the stem engages with at least one flat defining the outer recess, the interface between the at least one flat on the exterior of the stem interfacing with the at least one flat defining the outer recess preventing rotation of the stem within the outer recess.

The stem includes a leading surface, a trailing surface, and a side surface between the leading surface and the trailing surface; the outer recess includes a leading wall and a trailing wall; and the leading surface interfaces with the leading wall and the trailing surface interfaces with the trailing wall to prevent rotation of the stem within the outer recess.

The leading surface is flat and the side surface is curved.

A grinding drum for grinding hardened material includes a mounting tube, the mounting tube elongate along a tube axis, the mounting tube have a plurality of bit mounting receivers arrayed circumferentially around and longitudinally along the mounting tube; a first end hub mounted to a first end of the mounting tube, the first end hub including a first shaft bore extending therethrough on the tube axis; a second end hub mounted to a second end of the mounting tube, the second end hub including a second shaft bore extending therethrough on the tube axis, the second shaft bore axially aligned with the first shaft bore such that a drive shaft can extend through the first shaft bore, the mounting tube, and the second shaft bore; and a plurality of bit mountings respectively received in the plurality of bit mounting receivers, the plurality of bit mountings comprising a plurality of bits; wherein each bit mounting of the plurality of bit mountings are individually mounted to the mounting tube and are removably mounted to the mounting tube.

The grinding drum of the preceding paragraph can optionally include, additionally and/or alternatively, any one or more of the following features, configurations and/or additional components:

The first end hub does not project radially outward beyond an outer surface of the mounting tube.

The second end hub does not project radially outward beyond the outer surface.

The first end hub and the second end hub do not contact any bit mounting of the plurality of bit mountings.

The first end hub comprises: a hub body through which the first shaft bore extends; and a hub flange extending radially outward from the hub body; wherein the hub flange axially overlaps with the mounting tube and at least one hub fastener extends through the hub flange and into the mounting tube to connect the first end hub to the mounting tube.

At least one aperture is formed through the hub flange, wherein the at least one hub fastener extends through the at least one aperture, and wherein the at least one aperture is circumferentially elongated.

At least one aperture is formed through the hub flange, wherein the at least one hub fastener extends through the at least one aperture, and wherein the at least one aperture is oblong.

The at least one aperture is recessed from an axially outer face of the first end hub.

The first end hub includes: a hub body through which the first shaft bore extends; a hub flange extending radially outward from the hub body; a plurality of mount notches extending into an outer face of the first end hub; and a plurality of apertures extending through the hub flange, each aperture of the plurality of apertures open into a mount notch of the plurality of mount notches; wherein the hub flange axially overlaps with the mounting tube and a plurality of hub fasteners extend through the plurality of apertures and into the mounting tube to connect the first end hub to the mounting tube.

The at least one aperture is circumferentially elongate.

The hub body extends into the mounting tube such that the hub body radially overlaps with at least one bit mounting of the plurality of bit mountings.

The first end hub is at least partially disposed within the mounting tube such that the first end hub radially overlaps with a first bit mounting of the plurality of bit mountings.

The first end hub radially overlaps with fewer than all of the bit mountings of the plurality of bit mountings.

The second end hub is at least partially disposed within the mounting tube such that the second end hub radially overlaps with a second bit mounting of the plurality of bit mountings.

A first subset of bit mountings of the plurality of bit mountings radially overlap with the first end hub and a second subset of bit mountings of the plurality of bit mountings radially overlap with the second end hub.

A third subset of bit mountings of the plurality of bit mountings is not radially overlapped by the first end hub or the second end hub.

A first bit mounting of the plurality of bit mountings is mounted to a first bit mounting receiver of the plurality of bit mounting receivers; the first bit mounting receiver comprises: an outer recess extending into the mounting tube from an exterior of the mounting tube; and an inner receiver extending into the mounting tube from the outer recess; and the first bit mounting comprises: a first bit holder supporting a first bit of the plurality of bits, the first bit holder including a stem and a head, wherein the stem is at least partially disposed in the outer recess.

A mount fastener extending through the first bit holder and engaging the mounting tube within the inner receiver.

The mount fastener is threadedly connected to the mounting tube.

A holder bore extends fully through the first bit holder along a mount axis, the mount fastener at least partially disposed in the holder bore.

At least one flat on an exterior of the stem engages with at least one flat defining the outer recess, the interface between the at least one flat on the exterior of the stem interfacing with the at least one flat defining the outer recess preventing rotation of the stem within the outer recess.

The stem includes a leading surface, a trailing surface, and a side surface between the leading surface and the trailing surface; the outer recess includes a leading wall and a trailing wall; and the leading surface interfaces with the leading wall and the trailing surface interfaces with the trailing wall to prevent rotation of the stem within the outer recess.

The leading surface is flat and the side surface is curved.

A grinding drum for grinding hardened material includes a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits; wherein each bit mounting of the plurality of bit mountings is removably mounted to the mounting tube; and wherein each bit mounting of the plurality of bit mountings is angled offset from the tube axis.

The grinding drum of the preceding paragraph can optionally include, additionally and/or alternatively, any one or more of the following features, configurations and/or additional components:

Each bit mounting of the plurality of bit mountings is aligned on a mount axis that is offset from the tube axis such that the mount axis does not intersect the tube axis.

For each bit mounting of the plurality of bit mountings includes a mount fastener that extends through a bit holder of the bit mounting and into the mounting tube, the mount fastener disposed on a mount axis that is offset from the tube axis such that the mount axis does not intersect the tube axis.

For each bit mounting of the plurality of bit mountings the bit is supported by the bit holder, and wherein the bit is a portion of the bit mounting disposed furthest radially away from the mounting tube relative to the tube axis.

A grinding drum for grinding hardened material includes a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits; wherein a first bit mounting of the plurality of bit mountings is at least partially disposed in a first bit mounting receiver of the plurality of bit mounting receivers; and wherein the first bit mounting receiver extends along a mount axis angled relative to the tube axis such that the mount axis does not intersect the tube axis.

The grinding drum of the preceding paragraph can optionally include, additionally and/or alternatively, any one or more of the following features, configurations and/or additional components:

A first mount fastener extends through the first bit mounting and into the mounting tube to secure the first bit mounting to the mounting tube, the first mount fastener extending along the mount axis.

The first bit radially overlaps with the first mount fastener.

A radially outer end of the first mount fastener with regard to the tube axis is disposed rearward from a radially inner end of the first mount fastener relative to a rotational direction of the mounting tube.

The outer recess includes a leading wall and the trailing wall, and wherein a height of the leading wall differs from a height of the trailing wall.

The height of the leading wall is less than the height of the trailing wall.

A grinding drum for grinding hardened material includes a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits; wherein a first bit mounting of the plurality of bit mountings comprises: a first head supporting a first bit of the plurality of bits; a first stem extending from the first head; wherein a first bit mounting receiver of the plurality of bit mounting receivers comprises a first outer recess; wherein the first stem is at least partially disposed in the first outer recess such that a first leading inner notch of the first outer recess receives a first leading corner of the first stem and such that the first leading corner is radially overlapped by material defining the first outer recess both radially inward towards the tube axis and radially outward away from the tube axis.

The grinding drum of the preceding paragraph can optionally include, additionally and/or alternatively, any one or more of the following features, configurations and/or additional components:

The first leading inner notch is formed between a first leading wall of the first outer recess and a first rim floor of the first outer recess.

The first bit mounting is mounted to the mounting tube by a first mount fastener extending through the first bit mounting and through the first rim floor into a first inner receiver of the first bit mounting receiver.

The first mount fastener is threadedly connected to the mounting tube within the first inner receiver.

The first outer recess includes a first trailing notch and wherein a first trailing corner of the first stem is disposed in the first trailing notch.

The first trailing notch is formed between a first trailing wall of the first outer recess and the first rim floor.

A height of the first leading wall is less than a height of the first trailing wall.

At least one flat of the first outer recess interfaces with at least one flat of the first stem to prevent rotation of the first stem within the first outer recess.

The mounting tube includes a first slot extending from a trailing end of the first bit mounting receiver.

A width of the first slot increases as the first slot extends away from the first bit mounting receiver.

A grinding drum for grinding hardened material includes a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits; wherein a first subset of the plurality of bit mountings is disposed in a first bit mounting array that extends axially and circumferentially about the mounting tube.

The grinding drum of the preceding paragraph can optionally include, additionally and/or alternatively, any one or more of the following features, configurations and/or additional components:

A first bit mounting of the first subset of the plurality of bit mountings at least partially circumferentially overlaps with a second bit mounting of the first subset of the plurality of bit mountings.

The first bit mounting is offset axially from the second bit mounting.

The first bit mounting is offset circumferentially from the second bit mounting.

The first subset of the plurality of bit mountings extends helically about the mounting tube.

A second subset of the plurality of bit mountings is disposed in a second bit mounting array that extends axially and circumferentially about the mounting tube.

A bit mounting of the first subset of the plurality of bit mountings at least partially axially overlaps with a bit mounting of the second subset of the plurality of bit mountings.

The bit mounting of the first subset of the plurality of bit mountings partially axially overlaps with the bit mounting of the second subset of the plurality of bit mountings.

The bit mounting of the first subset of the plurality of bit mountings is circumferentially offset from the bit mounting of the second subset of the plurality of bit mountings.

A grinding drum for grinding hardened material includes a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits; wherein a first subset of the plurality of bit mountings is disposed in a first bit mounting row that extends axially and circumferentially about the mounting tube.

The grinding drum of the preceding paragraph can optionally include, additionally and/or alternatively, any one or more of the following features, configurations and/or additional components:

A first bit mounting of the first bit mounting row is circumferentially offset from a second bit mounting of the first bit mounting row.

A first bit mounting of the first bit mounting row at least partially axially overlaps with a second bit mounting of the first bit mounting row.

A first bit mounting of the first bit mounting row axially overlaps with a second bit mounting of the first bit mounting row, and the first bit mounting is circumferentially offset from the second bit mounting.

A second subset of the plurality of bit mountings is disposed in a second bit mounting row and a bit mounting of the second bit mounting row axially overlaps at least one bit mounting of the first bit mounting row.

The plurality of bit mountings are disposed in a plurality of bit mounting array; and each bit mounting array of the plurality of bit mounting arrays extends axially and circumferentially about the mounting tube.

The first bit mounting row includes at least one bit mounting from a first bit mounting array of the plurality of bit mounting arrays and includes at least one bit mounting from a second bit mounting array of the plurality of bit mounting arrays.

A grinding drum for grinding hardened material includes a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits; wherein the plurality of bit mountings are disposed in a plurality of bit mounting arrays and a plurality of bit mounting rows; wherein laterally adjacent bit mountings within a bit mounting array of the plurality of bit mounting arrays circumferentially overlap; and wherein longitudinally adjacent bit mountings within a bit mounting row of the plurality of bit mounting rows axially overlap.

The grinding drum of the preceding paragraph can optionally include, additionally and/or alternatively, any one or more of the following features, configurations and/or additional components:

The laterally adjacent bit mountings within the bit mounting array do not axially overlap.

Longitudinally adjacent bit mountings within the bit mounting row do not circumferentially overlap.

A grinding drum for grinding hardened material includes a mounting tube elongate along a tube axis, the mounting tube configured to support a plurality of bits; a first end hub mounted to a first end of the mounting tube, the first end hub including a first shaft bore extending therethrough on the tube axis; and a second end hub mounted to a second end of the mounting tube, the second end hub including a second shaft bore extending therethrough on the tube axis, the second shaft bore axially aligned with the first shaft bore such that a drive shaft can extend through the first shaft bore, the mounting tube, and the second shaft bore.

The grinding drum of the preceding paragraph can optionally include, additionally and/or alternatively, any one or more of the following features, configurations and/or additional components:

The mounting tube includes a plurality of bit mounting receivers and a plurality of bit mountings configured to mount in the plurality of bit mounting receivers, the plurality of bit mountings comprising the plurality of bits.

Each bit mounting of the plurality of bit mountings is individually mountable to and removable from the mounting tube.

The first end hub includes a hub body through which the first shaft bore extends; a hub flange extending radially outward from the hub body; a plurality of mount notches extending into an outer face of the first end hub; and a plurality of apertures extending through the hub flange, each aperture of the plurality of apertures open into a mount notch of the plurality of mount notches; wherein the hub flange axially overlaps with the mounting tube and a plurality of hub fasteners extend through the plurality of apertures and into the mounting tube to connect the first end hub to the mounting tube.

A plurality of bit mounting receivers formed on the mounting tube, the plurality of bit mounting receivers arrayed circumferentially around and longitudinally along the mounting tube; and a plurality of bit mountings respectively received in the plurality of bit mounting receivers, the plurality of bit mountings comprising the plurality of bits; wherein each bit mounting of the plurality of bit mountings is individually mounted.

While the invention(s) has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention(s) without departing from the essential scope thereof. Therefore, it is intended that the invention(s) not be limited to the particular embodiment(s) disclosed, but that the invention(s) may include all embodiments falling within the scope of the appended claims. Any single feature, or any combination of features from one embodiment show herein, may be utilized in a different embodiment independent from the other features shown in the embodiment herein. Accordingly, the scope of the invention(s) and any claims thereto are not limited to the particular to the embodiments and/or combinations of the features shown herein, but rather can include any combination of one, two, or more features shown herein.

The invention claimed is:

1. A grinding drum for grinding hardened material, the grinding drum comprising:

a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits wherein a first bit mounting of the plurality of bit mountings is mounted to a first bit mounting receiver of the plurality of bit mounting receivers;

the first bit mounting receiver comprising:

an outer recess extending into the mounting tube from an exterior of the mounting tube; and an inner receiver extending into the mounting tube from the outer recess;

the first bit mounting comprising:

a first bit holder supporting a first bit of the plurality of bits, the first bit holder including a stem and a head, wherein the stem is at least partially disposed in the outer recess and the first bit is mounted to the head;

a mount fastener that extends through the stem and the head of the first bit mounting and extends into the first bit mounting receiver;

wherein the plurality of bit mounting receivers are disposed in at least one mounting array and wherein the at least one mounting array is disposed helically about the mounting tube.

2. The grinding drum of claim 1, wherein the at least one mounting array includes a plurality of mounting arrays, and wherein each mounting array of the plurality of mounting arrays is disposed helically about the mounting tube.

3. The pavement grinding drum of claim 2, wherein the plurality of mounting arrays are disposed helically parallel with respect to each other.

4. The grinding drum of claim 1, wherein each bit of the plurality of bits has a common cutting shape with respect to each other bit of the plurality of bits.

5. The grinding drum of claim 1, wherein the plurality of bit mountings are arranged so that a leading bit mounting partially overlaps and is partially offset from a trailing bit mounting.

6. The grinding drum of claim 1, wherein each bit mounting receiver of the plurality of bit mounting receivers comprises a leading inner notch into which a leading corner of the bit mounting of the plurality of bit mountings received within the bit mounting receiver is seated.

7. The grinding drum of claim 6, wherein a leading wall of the leading inner notch is located directly radially outward of the leading corner such that the leading corner is located radially underneath the leading wall.

8. The grinding drum of claim 6, wherein the leading corner is disposed in the leading inner notch such that the leading corner is radially overlapped by material defining the bit mounting receiver within which the bit mounting is disposed both radially inward and radially outward from the leading corner.

9. The grinding drum of claim 1, wherein each bit mounting of the plurality of bit mountings is orientated offset from the tube axis.

10. The grinding drum of claim 1, wherein the mount fastener is angled offset from the tube axis.

11. The grinding drum of claim 10, wherein the mount fastener is disposed behind the bit relative to a direction of rotation of the mounting tube.

12. The grinding drum of claim 1, further comprising:

a first end hub mounted to a first end of the mounting tube, the first end hub including a first shaft bore extending therethrough on the tube axis; and a second end hub mounted to a second end of the mounting tube, the second end hub including a second shaft bore extending therethrough on the tube axis, the second shaft bore axially aligned with the first shaft bore such that a drive shaft can extend through the first shaft bore, the mounting tube, and the second shaft bore.

13. The grinding drum of claim 12, wherein the first end hub includes:

a hub body through which the first shaft bore extends; and a hub flange extending radially outward from the hub body;

a plurality of mount notches extending into an outer face of the first end hub; and a plurality of apertures extending through the hub flange, each aperture of the plurality of apertures open into a mount notch of the plurality of mount notches;

wherein the hub flange axially overlaps with the mounting tube and a plurality of hub fasteners extend through the plurality of apertures and into the mounting tube to connect the first end hub to the mounting tube.

14. The grinding drum of claim 12, wherein a first subset of bit mountings of the plurality of bit mountings radially overlap with the first end hub and a second subset of bit mountings of the plurality of bit mountings radially overlap with the second end hub.

15. The grinding drum of claim 1, wherein:

the stem includes a leading surface, a trailing surface, and a side surface between the leading surface and the trailing surface;

the outer recess includes a leading wall and a trailing wall; and the leading surface interfaces with the leading wall and the trailing surface interfaces with the trailing wall to prevent rotation of the stem within the outer recess.

16. A grinding drum for grinding hardened material, the grinding drum comprising:

a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits, wherein a first bit mounting of the plurality of bit mountings is mounted to a first bit mounting receiver of the plurality of bit mounting receivers;

the first bit mounting including a first bit holder supporting a first bit of the plurality of bits, the first bit holder including a stem and a head, the stem at least partially disposed in the first bit mounting receiver and the first bit connected to the head;

the mounting tube including a first slot extending from a trailing end of the first bit mounting receiver;

wherein the first bit holder is mounted to the first bit mounting receiver such that a trailing end of the first bit holder extends over the slot and is spaced away from a base of the slot;

wherein each bit mounting of the plurality of bit mountings is individually removably mounted to the mounting tube; and wherein each bit mounting of the plurality of bit mountings is angled offset from the tube axis.

17. A grinding drum for grinding hardened material, the grinding drum comprising:

a mounting tube, the mounting tube elongate along a tube axis, the mounting tube have a plurality of bit mounting receivers arrayed circumferentially around and longitudinally along the mounting tube; and a plurality of bit mountings respectively received in the plurality of bit mounting receivers, the plurality of bit mountings comprising a plurality of bits wherein a first bit mounting of the plurality of bit mountings is mounted to a first bit mounting receiver of the plurality of bit mounting receivers;

the first bit mounting receiver comprising:

an outer recess extending into the mounting tube from an exterior of the mounting tube; and an inner receiver extending into the mounting tube from the outer recess;

the first bit mounting comprising:

a first bit holder supporting a first bit of the plurality of bits, the first bit holder including a stem and a head, wherein the stem is at least partially disposed in the outer recess and the first bit is mounted to the head, wherein the head extends forward and rearward of the stem;

wherein a leading surface of the stem includes a first flat, a leading wall of the outer recess includes a second flat, and the first flat interfaces with the second flat to inhibit rotation of the stem within the outer recess, wherein the outer recess includes a first side wall and a second side wall extending from the leading wall, and wherein the first side wall and the second side wall are curved;

wherein the plurality of bit mounting receivers are disposed in at least one mounting array and wherein the at least one mounting array is disposed helically about the mounting tube.

* * * * *